United States Patent
Tang

(10) Patent No.: US 10,639,795 B2
(45) Date of Patent: May 5, 2020

(54) LIGHT SPOT INDICATION ROBOT AND LIGHT SPOT INDICATION METHOD THEREOF

(71) Applicant: ECOVACS ROBOTICS CO., LTD., Suzhou (CN)

(72) Inventor: Jinju Tang, Suzhou (CN)

(*) Notice: Subject to any disclaimer, the term of this patent is extended or adjusted under 35 U.S.C. 154(b) by 653 days.

(21) Appl. No.: 15/109,374

(22) PCT Filed: Dec. 31, 2014

(86) PCT No.: PCT/CN2014/095772
§ 371 (c)(1),
(2) Date: Aug. 11, 2016

(87) PCT Pub. No.: WO2015/101311
PCT Pub. Date: Jul. 9, 2015

(65) Prior Publication Data
US 2016/0368143 A1   Dec. 22, 2016

(30) Foreign Application Priority Data

Jan. 3, 2014   (CN) .......................... 2014 1 0003146

(51) Int. Cl.
*B25J 9/16* (2006.01)
*G06T 7/00* (2017.01)
(Continued)

(52) U.S. Cl.
CPC ............ *B25J 9/1679* (2013.01); *G05B 19/00* (2013.01); *G06T 7/70* (2017.01);
(Continued)

(58) Field of Classification Search
CPC .................. B25J 9/1679; G05B 19/00; G05B 2219/31048; G05B 2219/40103;
(Continued)

(56) References Cited

U.S. PATENT DOCUMENTS

| | | | |
|---|---|---|---|
| 5,987,591 A | | 11/1999 | Jyumonji |
| 9,002,511 B1 * | | 4/2015 | Hickerson ............ G01S 17/026 700/245 |

(Continued)

FOREIGN PATENT DOCUMENTS

| | | |
|---|---|---|
| CN | 102323829 | 1/2012 |
| CN | 102411749 | 4/2012 |

(Continued)

OTHER PUBLICATIONS

International Searching Authority, "Search Report and Written Opinion", issued in connection with PCT patent application No. PCT/CN2014/095772, dated Apr. 1, 2015, 12 pages.

(Continued)

*Primary Examiner* — Abdelmoniem I Elamin

(57) ABSTRACT

A light spot indication robot and a light spot indication method thereof are arranged. The light spot indication robot comprises a robot body which is arranged with a control module, a camera module and a laser indication module (100), wherein the laser indication module (100) emits a laser beam, the imaging module shoots to-be-indicated objects to form an image plane, the laser beam and the to-be-indicated object are projected onto the image plane to form a laser spot projection position and to-be-indicated object projection positions, respectively. The light spot indication robot is also arranged with a signal input module. According to content shown on the image plane of the to-be-indicated objects shot by the imaging module and input information of the signal input module, a target object among the to-be-indicated objects is determined. The control module controls the laser indication module to move, so as to cause the laser spot projection position to coincide with a projection position of the target object in the image plane. The present invention converts the location in a three- (Continued)

dimensional space into the location in a two-dimensional space, and has a small computation amount and a quick and accurate position indication.

11 Claims, 2 Drawing Sheets

(51) Int. Cl.
| | |
|---|---|
| *G05B 19/00* | (2006.01) |
| *G06T 7/70* | (2017.01) |
| *G06F 3/02* | (2006.01) |
| *G06F 3/0354* | (2013.01) |
| *G06F 3/041* | (2006.01) |
| *G06F 3/16* | (2006.01) |

(52) U.S. Cl.
CPC .............. *G05B 2219/31048* (2013.01); *G05B 2219/40103* (2013.01); *G06F 3/02* (2013.01); *G06F 3/03543* (2013.01); *G06F 3/041* (2013.01); *G06F 3/16* (2013.01); *Y02P 90/04* (2015.11); *Y10S 901/02* (2013.01); *Y10S 901/30* (2013.01)

(58) Field of Classification Search
CPC ........ G06F 3/02; G06F 3/03543; G06F 3/041; G06F 3/16; G06T 7/70; Y02P 90/04; Y10S 901/02; Y10S 901/30
See application file for complete search history.

(56) References Cited

U.S. PATENT DOCUMENTS

| | | | |
|---|---|---|---|
| 9,298,254 B2* | 3/2016 | Ha | G06F 3/01 |
| 2002/0169522 A1* | 11/2002 | Kanno | B25J 9/1666 |
| | | | 700/245 |
| 2003/0078694 A1* | 4/2003 | Watanabe | B25J 9/1697 |
| | | | 700/245 |
| 2006/0111814 A1 | 5/2006 | Hachitani et al. | |
| 2008/0201014 A1* | 8/2008 | Sonoura | G05D 1/024 |
| | | | 700/250 |
| 2009/0234502 A1 | 9/2009 | Ueyama et al. | |
| 2010/0131235 A1* | 5/2010 | Aoba | G01B 11/2518 |
| | | | 702/153 |
| 2012/0194651 A1 | 8/2012 | Kanto et al. | |
| 2015/0168954 A1* | 6/2015 | Hickerson | G01S 17/026 |
| | | | 700/259 |

FOREIGN PATENT DOCUMENTS

| | | |
|---|---|---|
| CN | 102645932 | 8/2012 |
| CN | 203673356 | 6/2014 |
| JP | 2007196300 | 8/2007 |
| WO | 9724206 | 7/1997 |

OTHER PUBLICATIONS

State Intellectual Property Office of the People's Republic of China, "Office Action," issued in connection with Chinese Patent Application No. 201410003146.1, dated Jan. 6, 2017, 5 pages.

* cited by examiner

LIGHT SPOT INDICATION ROBOT AND LIGHT SPOT INDICATION METHOD THEREOF

FIELD OF THE INVENTION

The present invention relates to a light spot indication robot and a light spot indication method thereof, which belongs to the technical field of small home appliance manufacturing technology.

BACKGROUND ART

A shopping-guiding robot is one kind of commonly-used self-moving robot, and is more interactive with a user. The current shopping-guiding robot usually uses a light spot to indicate an object. Generally, the laser spot is projected onto a specified object by a laser pointer arranged on the robot body, hereby completing the shopping-guiding action with the light spot indicating the object. The specific process comprises: the shopping-guiding robot which uses the light spot to indicate the target object needs to obtain three-dimensional coordinates of the target object; and then a control unit controls the laser pointer to move according to the obtained three-dimensional coordinates, so that the laser spot moves to the position having the three-dimensional coordinates of the target object, hereby completing the entire action of the indication of the object by using the light spot. However, in practice, it is difficult to obtain the three-dimensional coordinates of the target object. In addition, during the control process, the laser pointer is controlled to rotate at a certain angle in a certain direction according to the three-dimensional coordinates of the target object so that the laser spot can move to the specified position; however, this requires a large amount of calculation, and also requires a higher demand on the control unit.

SUMMARY OF THE INVENTION

In view of the above deficiencies in the prior art, the object of the present invention is to provide a light spot indication robot and a light spot indication method thereof. The present invention converts the location in a three-dimensional space into the location in a two-dimensional space, and has a small computation amount and a quick and accurate position indication.

The object of the present invention is achieved by the following technical solutions.

A light spot indication robot comprises a robot body arranged with a control module, an imaging module and a laser indication module, wherein the laser indication module emits a laser beam, the imaging module shoots to-be-indicated objects to form an image plane, and the laser beam and the to-be-indicated object are projected onto the image plane to form a laser spot projection position and to-be-indicated object projection positions, respectively. The light spot indication robot is further arranged with a signal input module, wherein a target object among the to-be-indicated objects is determined by input information of the signal input module according to content shown on the image plane of the to-be-indicated objects shot by the imaging module, and the control module controls the laser indication module to move, so that the laser spot projection position coincides with the projection position of the target object in the image plane.

According to different requirements of the user, the signal input module may adopt various structural configurations. For example, the signal input module may be in a form of a mouse or a touch panel, wherein the target object among the to-be-indicated objects is determined by a clicking of the mouse or a tapping on the touch panel; or the signal input module may be in a form of a keyboard or an audio input device, wherein the image plane is divided into cells having respective position codes, and the target object among the to-be-indicated objects is determined by information of the code, which is inputted by the keyboard or the audio input device, of the cell within which the target object is located.

More specifically, the laser indication module comprises a laser pointer and a driving means including a first motor and a second motor, wherein the second motor is fixedly arranged on an output shaft of the first motor, and the output shaft of the first motor is arranged by being vertical to and coplanar with an output shaft of the second motor. The laser pointer includes a fixed end and a free end, wherein the fixed end is fixedly arranged on the output shaft of the second motor with a fixed point being an intersection point of the output shaft of the first motor and the output shaft of the second motor, the free end swings around the fixed end, and a swing plane of the laser pointer is vertical to the output shaft of the second motor.

In order to ensure the normal operation of the laser indication module, the output shaft of the first motor is vertical to the image plane.

In addition to the above driving manner, the laser indication module may comprise a laser pointer and a driving means including a third motor and a forth motor, wherein the third motor and the forth motor drive the laser pointer to swing in two directions vertical to each other, respectively.

The light spot indication robot is a shopping-guiding robot or a way-directing robot.

The present invention further provides a light spot indication method for a light spot indication robot comprising an imaging module, a laser indication module and a signal input module, wherein the light spot indication method comprises the following steps:

Step 1: emitting a laser beam by the laser indication module, and shooting to-be-indicated objects to form an image plane by the imaging module, wherein the image plane is arranged with an X axis and a Y axis that is vertical to the X axis;

Step 2: determining a target object among the to-be-indicated objects by input information of the signal input module according to content shown in the image plane of the to-be-indicated objects shot by the imaging module, and obtaining a projection position Q' of the target object in the image plane; and Step 3: moving the laser indication module so that a real-time laser spot projection position P' coincides with the projection position Q' of the target object in the image plane.

Here, the laser indication module comprises a laser pointer and a driving means including a first motor and a second motor, wherein the second motor is fixedly arranged on an output shaft of the first motor, and the output shaft of the first motor is arranged by being vertical to and coplanar with an output shaft of the second motor. The laser pointer includes a fixed end and a free end, wherein the fixed end is fixedly arranged on the output shaft of the second motor with a fixed point being an intersection point of the output shaft of the first motor and the output shaft of the second motor, the free end swings around the fixed end, and a swing plane of the laser pointer is vertical to the output shaft of the second motor.

When a centerline of the laser pointer is on the same line with the output shaft of the first motor, the laser spot projection position in the image plane is set as O'. When the output shaft of the second motor is parallel to the X axis, an angle between the second motor and the X axis is defined as 0°.

The Step 3 specifically comprises:

Step 3-1: calculating an angle θ between a line O'Q' and the X axis in the image plane (A'), and by the first motor, driving the second motor to rotate to an angular position of θ±90°; and Step 3-2: shooting and obtaining the real-time laser spot projection position P' in the image plane and comparing the projection position P' with the projection position Q' of the target object by the imaging module, and by the second motor, driving the free end of the laser pointer to swing around the fixed end until the real-time laser spot projection position P' coincides with the projection position Q' of the target object in the image plane.

In another embodiment, the laser indication module comprises a laser pointer and a driving means including a first motor and a second motor, wherein the second motor is fixedly arranged on an output shaft of the first motor, and the output shaft of the first motor is arranged by being vertical to and coplanar with an output shaft of the second motor.

The laser pointer includes a fixed end and a free end, wherein the fixed end is fixedly arranged on the output shaft of the second motor with a fixed point being an intersection point of the output shaft of the first motor and the output shaft of the second motor, the free end rotates around the fixed end, and a rotating plane of the laser pointer is vertical to the output shaft of the second motor.

When a centerline of the laser pointer is on the same line with the output shaft of the first motor, the laser spot projection position in the image plane is set as O'. A distance between a focal point N of a camera lens in the imaging module and the image plane A' is d. When the output shaft of the second motor is parallel to the X axis, an angle between the second motor and the X axis is defined as 0°.

The step 3 specifically comprises:

Step 3-1': calculating an angle θ between a line O'Q' and the X axis in the image plane (A'), calculating an angle α of ∠O'NQ' in a plane O'NQ' according to the distance d between the focal point N and the image plane A'; and Step 3-2': separately or simultaneously driving the first motor and the second motor, to cause the second motor to rotate to an angle of θ±90° and cause the laser pointer to swing to the angle α, so that the real-time laser spot projection position P' coincides with the projection position Q' of the target object in the image plane.

Further, the laser indication module comprises a laser pointer and a driving means including a third motor and a forth motor, wherein the third motor and the forth motor drive the laser pointer to swing in an X axis direction and a Y axis direction which is vertical to the X axis direction, respectively. The imaging module shoots and obtains the real-time laser spot projection position P' in the image plane, and compares the projection position P' with the projection position Q' of the target object. The step 3 specifically comprises:

causing the laser pointer to swing in the X axis direction until the laser spot projection position P' has the same x-axis coordinate as the projection position Q' of the target object in the image plane; and causing the laser pointer to swing in the Y axis direction until the laser spot projection position P' has the same y-axis coordinate as the projection position Q' of the target object in the image plane.

In conclusion, the present invention converts the location in a three-dimensional space into the location in a two-dimensional space, and has a small computation amount and a quick and accurate position indication.

Hereinafter, the technical solutions of the present invention will be described in detail with reference to the accompanied drawings and particular embodiments.

DESCRIPTION OF ATTACHED DRAWINGS

DETAILED DESCRIPTION OF PREFERRED EMBODIMENTS

The First Embodiment

The present invention provides a light spot indication robot comprising a robot body which is arranged with a control module, an imaging module and a laser indication module, wherein the laser indication module emits a laser beam, the imaging module shoots to-be-indicated objects to form an image plane, and the laser beam and the to-be-indicated objects are projected onto the image plane to form a laser spot projection position and to-be-indicated object projection positions, respectively. The light spot indication robot is further arranged with a signal input module. According to content shown on the image plane of the to-be-indicated objects shot by the imaging module, the target object among the to-be-indicated objects is determined by input information of the signal input module. The control module controls the laser indication module to move, so that the laser spot projection position coincides with a projection position of the target object in the image plane.

According to different requirements of the user, the signal input module may adopt various structural configurations. The signal input module may be in a form of a mouse or a touch panel. The target object among the to-be-indicated objects is determined by a clicking of the mouse or a tapping on the touch panel. Alternatively, the signal input module may be in a form of a keyboard or an audio input device. The image plane is divided into cells having respective position codes, and the target object among the to-be-indicated objects is determined by information of the code, which is inputted by the keyboard or the audio input device, of the cell within which the target object is located. Regardless of what kind of the signal input module, the signal input module is arranged for determining the target object among the to-be-indicated objects. For instance, when the light spot indication robot is a shopping-guiding robot, the to-be-indicated objects are all products exhibited on shelves, and the target object is the product that is actually desired to be purchased by the user. It is to be noted that the signal input module on the light spot indication robot may directly receive an input signal from the robot body, or receive an input signal from a remote terminal in a wired or wireless manner (ADSL, Bluetooth, IrDA, GPRS, 3G, WIFI, or the like) for example.

Figure 1:
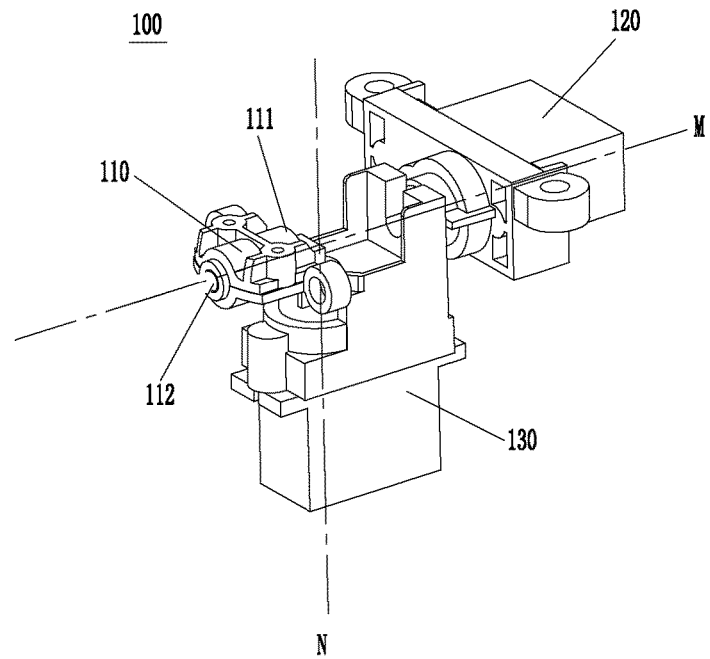
FIG. 1 is one schematic structural diagram of the laser indication module according to a first embodiment of the present invention.
Figure 2:
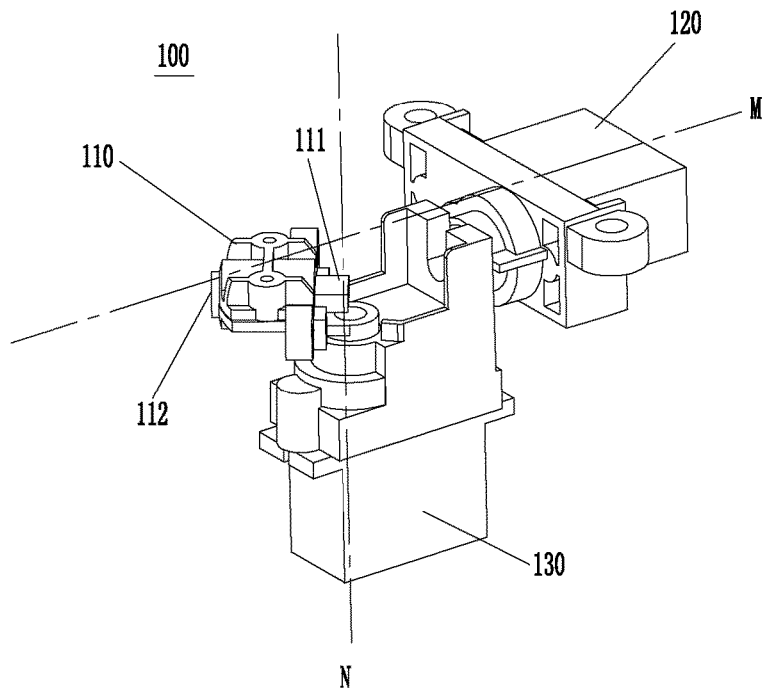
FIG. 2 is another schematic structural diagram of the laser indication module according to the first embodiment of the present invention.

FIGS. 1 and 2 are schematic structural diagrams of the laser indication module according to the first embodiment of the present invention. As shown in FIG. 1 in combination with FIG. 2, the laser indication module 100 comprises a laser pointer 110 and a driving means including a first motor 120 and a second motor 130. The second motor 130 is fixedly arranged on an output shaft M of the first motor 120, and the output shaft M of the first motor 120 is arranged by being vertical to and coplanar with an output shaft N of the second motor 130. The laser pointer 110 includes a fixed end 111 and a free end 112, wherein the fixed end 111 is fixedly arranged on the output shaft N of the second motor 130 with a fixed point being an intersection point of the output shaft the first motor 120 and the output shaft N of the second motor 130. The free end 112 swings around the fixed end 111. The swing plane of the laser pointer 110 is vertical to the output shaft N of the second motor 130. In order to ensure the normal operation of the laser indication module, the output shaft M of the first motor 120 is vertical to the image plane.

Figure 3:
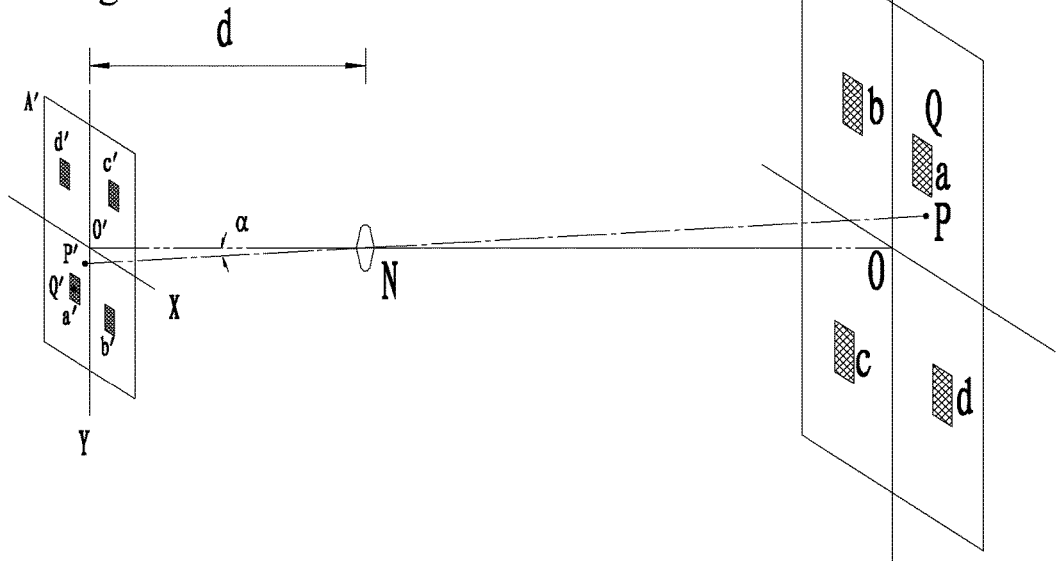
FIG. 3 is a schematic diagram showing the relationship between the projection of any laser beam on an image plane and the projection of the laser beam on a real plane according to the present invention.
Figure 4:
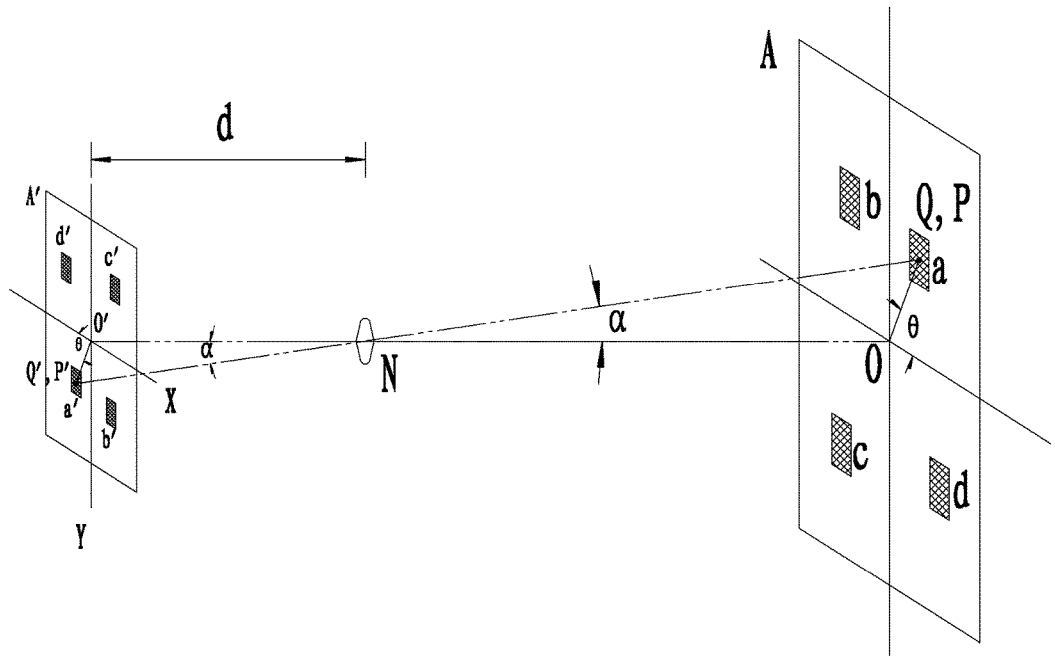
FIG. 4 is a schematic diagram showing that a real-time laser spot projection position P' coincides with a projection position Q' of a target object in the image plane.

FIG. 3 is a schematic diagram showing the relationship between the projection of any laser beam on the image plane and the projection of the laser beam on a real plane according to the present invention, and FIG. 4 is a schematic diagram showing that a real-time laser spot projection position P' coincides with a projection position Q' of a target object in the image plane. As shown in FIG. 3 in combination with FIG. 4, a light spot indication method for the light spot indication robot according to the present invention comprises the following steps: in Step 1, emitting a laser beam by the laser indication module, and shooting the to-be-indicated objects to form the image plane A' by the imaging module, wherein the image plane A' is arranged with an X axis and a Y axis that is vertical to the X axis; in Step 2, determining the target object a' among the to-be-indicated objects a', b', c' and d' by the input information of the signal input module according to the content shown on the image plane A' of the to-be-indicated objects shot by the imaging module, to obtain the projection position Q' of the target object in the image plane A'; and in Step 3, moving the laser indication module so that the real-time laser spot projection position P' coincides with the projection position Q' of the target object in the image plane A'. As shown in FIG. 4, the indication position after the coincidence is positioned at the center of the target object a'.

As shown in FIGS. 1-4, when the centerline of the laser pointer is on the same line with the output shaft of the first motor, the laser spot projection position in the image plane is set as O', and when the output shaft of the second motor is parallel to the X axis, an angle between the second motor and the X axis is defined as 0°.

The above Step 3 specifically comprises:

In Step 3-1, calculating an angle θ between a line O'Q' and the X axis in the image plane A', and by the first motor, driving the second motor to rotate to an angular position of θ±90°; and In Step 3-2, shooting and obtaining a real-time laser spot projection position P' in the image plane by the imaging module, comparing the projection position P' with the projection position Q' of the target object, and by the second motor, driving the free end of the laser pointer to swing around the fixed end until the real-time laser spot projection position P' coincides with the projection position Q' of the target object in the image plane.

In other words, in this embodiment, the process of causing the real-time laser spot projection position P' to coincide with the projection position Q' of the target object in the image plane A' is performed by calculating the angle θ between the line O'Q' and the X axis and then driving the free end of the laser pointer to swing. In this embodiment, the light spot indication robot is a shopping-guiding robot. Specifically, the operation process of the shopping-guiding robot is as follows: firstly, the laser indication module arranged in the shopping-guiding robot emits the laser beam, and meanwhile the imaging module arranged in the shopping-guiding robot shoots the to-be-indicated objects (for example, various products on the shelves of a supermarket) to form the image plane A', wherein the image plane A' is arranged with an X axis and a Y axis that is vertical to the X axis. The user can determine the target object a' (i.e., the product required to be purchased) among the to-be-indicated objects a', b', c' and d' by inputting information via the signal input module according to the various products on the shelves of the supermarket shot by the imaging module, and obtain the projection position Q' of the product a' in the image plane A'. According to the requirement or preference of the user, the input module may adopt various structural configurations. For example, the product that needs to be purchased may be determined by a clicking of a mouse or a tapping on a touch panel. Alternatively, the image plane may be divided into cells having respective position codes, and information of the code of the cell in which the product that is required to be purchased is input by a keyboard or an audio input device. Once the product that is required to be purchased is determined by any one of the above various input modules, the user can move the laser indication module so that the real-time laser spot projection position P' coincides with the projection position Q' of the product that is required to be purchased in the image plane A', hereby causing the laser spot for indication to be positioned on the product that is required to be purchased. Normally, the indication position is the center of the product to be purchased. Obviously, such indication method may have some deviation in indication position. However, since the product itself has a determined volume, a correct indication on the product that is required to be purchased can be ensured even if there is some indication position deviation. If the product itself has a relative small volume, for example, according to the input of the arrow keys of the keyboard module in the light spot indication robot or the remote control terminal, the control module further controls the laser spot to move, so as to finely adjust the laser indication position and ensure that the laser spot for indication is just positioned on the product that is required to be purchased.

Further, the light spot indication robot may be a way-directing robot instead of the above shopping-guiding robot described in this embodiment.

The Second Embodiment

In order to cause the real-time laser spot projection position P' to coincide with the projection position Q' of the product that is required to be purchased in the image plane A', this embodiment further provides the operation manner other than the above operation manner in which the angle θ between line O'Q' and the X axis is calculated and then the free end of the laser pointer is driven to swing.

As shown in FIG. 3 in combination with FIG. 4, specifically, in this embodiment, when the centerline of the laser pointer is on the same line with the output shaft of the first motor, the laser spot projection position in the image plane is set as O', and the distance between the focal point N of the camera lens in the imaging module and the image plane A' is d; and when the output shaft of the second motor is parallel to the X axis, an angle between the second motor and the X axis is defined as 0°.

The Step 3 specifically comprises:

Step 3-1': calculating the angle θ between the line O'Q' and the X axis in the image plane A', and calculating an angle α of ∠O'NQ' in the plane O'NQ' according to the distance d between the focal point N and the image plane A'; and Step 3-2': separately or simultaneously driving the first motor and the second motor to cause the second motor to rotate to an angle of θ±90° and cause the laser pointer to swing to the angle α, so that the real-time laser spot projection position P' coincides with the projection position Q' of the target object in the image plane.

In other words, in the second embodiment, the process of causing the real-time laser spot projection position P' to coincide with the projection position Q' of the target object in the image plane A' is performed by calculating the angel α based on the distance d between the focal point N and the image plane A', and then causing the laser pointer to swing to the angel α.

The other technical features of this embodiment are the same as those in the first embodiment, and will not be repeated in detail here.

The Third Embodiment

Further, except for the structure described in the first embodiment and the second embodiment, the structure configuration of the driving means in the laser indication module may comprise a third motor and a forth motor, wherein the third motor and the forth motor drive the laser pointer to swing in X axis direction and Y axis direction that is vertical to the X axis direction, respectively. The indication method performed by the robot adopting such driving means is different from that of the above two embodiments, in which the first two Steps 1 and 2 are the same as those of the first embodiment and the second embodiment, but the Step 3 is partially different. Specifically, the imaging module shoots and obtains the real-time laser spot projection position P' in the image plane, and the projection position P' is compared with the projection position Q' of the target object. The Step 3 specifically comprises: causing the laser pointer to swing in the X axis direction until the laser spot projection position P' has the same x-axis coordinate as the projection position Q' of the target object in the image plane; and causing the laser pointer to swing in the Y axis direction until the laser spot projection position P' has the same y-axis coordinate as the projection position Q' of the target object in the image plane. In other words, in this embodiment, the indication process of causing the real-time laser spot projection position P' to coincide with the projection position Q' of the target object in the image plane A' is performed by separately driving the laser pointer to swing in X axis direction and Y axis direction by the two motors.

In conclusion, the present invention provides a light spot indication robot and a light spot indication method thereof, wherein the laser indication module emits the laser beam; the imaging module shoots the to-be-indicated objects to form the image plane, the image plane being arranged with X axis and Y axis that is vertical to the X axis; the target object among the to-be-indicated objects is determined by the input information of the signal input module according to the content shown on the image plane of the to-be-indicated objects shot by the imaging module, and the projection position Q' of the target object in the image plane is obtained; and the laser indication module is moved so that the laser spot projection position P' coincide with the projection position Q' of the target object in the image plane. The present invention converts the location of the target object in a three-dimensional space into the location in a two-dimensional space, and includes the computations for obtaining the coordinates of the target object and the laser spot in the two-dimensional space and for moving the laser spot to the target object in the two-dimensional space. According to the present invention, the computation amount is small and the position indication is quick and accurate.

The invention claimed is:

1. A light spot indication robot comprising a robot body which is arranged with a control module, an imaging module and a laser indication module, wherein the laser indication module emits a laser beam; the imaging module shoots to-be-indicated objects to form an image plane; and the laser beam and the to-be-indicated object are projected onto the image plane to form a laser spot projection position and to-be-indicated object projection positions, respectively, characterized in that, the light spot indication robot is further arranged with a signal input module, wherein a target object among the to-be-indicated objects is determined by input information of the signal input module according to content shown on the image plane of the to-be-indicated objects shot by the imaging module, and the control module controls the laser indication module to move, so that the laser spot projection position coincides with the projection position of the target object in the image plane.

2. The light spot indication robot of claim 1, characterized in that, the signal input module is in a form of a mouse or a touch panel, wherein the target object among the to-be-indicated objects is determined by a clicking of the mouse or a tapping on the touch panel.

3. The light spot indication robot of claim 1, characterized in that, the signal input module is in a form of a keyboard or an audio input device, wherein the image plane is divided into cells having respective position codes, and the target object among the to-be-indicated objects is determined by information of the code, which is inputted by the keyboard or the audio input device, of the cell within which the target object is located.

4. The light spot indication robot of claim 1, characterized in that, the laser indication module comprises a laser pointer and a driving means including a first motor and a second motor, wherein the second motor is fixedly arranged on an output shaft of the first motor, and the output shaft of the first motor is arranged by being vertical to and coplanar with an output shaft of the second motor, and the laser pointer includes a fixed end and a free end, wherein the fixed end is fixedly arranged on the output shaft of the second motor with a fixed point being an intersection point of the output shaft of the first motor and the output shaft of the second motor, the free end swings around the fixed end, and a swing plane of the laser pointer is vertical to the output shaft of the second motor.

5. The light spot indication robot of claim 4, characterized in that, the output shaft of the first motor is vertical to the image plane.

6. The light spot indication robot of claim 1, characterized in that,
the laser indication module comprises a laser pointer and a driving means including a third motor and a forth motor, wherein the third motor and the forth motor drive the laser pointer to swing in two directions vertical to each other, respectively.

7. The light spot indication robot of claim 1, characterized in that,
the light spot indication robot is a shopping-guiding robot or a way-directing robot.

8. A light spot indication method for a light spot indication robot comprising an imaging module, a laser indication module and a signal input module, characterized in that, the light spot indication method comprises the following steps:
Step 1: emitting a laser beam by the laser indication module, and shooting to-be-indicated objects to form an image plane by the imaging module, wherein the image plane is arranged with an X axis and a Y axis that is vertical to the X axis;
Step 2: determining a target object among the to-be-indicated objects by input information of the signal input module according to content shown on the image plane of the to-be-indicated objects shot by the imaging module, and obtaining a projection position Q' of the target object in the image plane; and
Step 3: moving the laser indication module so that a real-time laser spot projection position P' coincides with the projection position Q' of the target object in the image plane.

9. The light spot indication method of claim 8,
the laser indication module comprises a laser pointer and a driving means including a first motor and a second motor, wherein the second motor is fixedly arranged on an output shaft of the first motor, and the output shaft of the first motor is arranged by being vertical to and coplanar with an output shaft of the second motor,
the laser pointer includes a fixed end and a free end, wherein the fixed end is fixedly arranged on the output shaft of the second motor with a fixed point being an intersection point of the output shaft of the first motor and the output shaft of the second motor, the free end swings around the fixed end, and a swing plane of the laser pointer is vertical to the output shaft of the second motor, and
when a centerline of the laser pointer is on the same line with the output shaft of the first motor, the laser spot projection position in the image plane is set as O', and when the output shaft of the second motor is parallel to the X axis, an angle between the second motor and the X axis is defined as 0°,
characterized in that, the Step 3 specifically comprises:
Step 3-1: calculating an angle θ between a line O'Q' and the X axis in the image plane (A'), and by the first motor, driving the second motor to rotate to an angular position of θ±90°; and
Step 3-2: shooting and obtaining the real-time laser spot projection position P' in the image plane and comparing the projection position P' with the projection position Q' of the target object by the imaging module, and by the second motor, driving the free end of the laser pointer to swing around the fixed end until the real-time laser spot projection position P' coincides with the projection position Q' of the target object in the image plane.

10. The light spot indication method of claim 8,
the laser indication module comprises a laser pointer and a driving means including a first motor and a second motor, wherein the second motor is fixedly arranged on an output shaft of the first motor, and the output shaft of the first motor is arranged by being vertical to and coplanar with an output shaft of the second motor,
the laser pointer includes a fixed end and a free end, wherein the fixed end is fixedly arranged on the output shaft of the second motor with a fixed point being an intersection point of the output shaft of the first motor and the output shaft of the second motor, the free end rotates around the fixed end, and a rotating plane of the laser pointer is vertical to the output shaft of the second motor, and
when a centerline of the laser pointer is on the same line with the output shaft of the first motor, the laser spot projection position in the image plane is set as O'; a distance between a focal point N of a camera lens in the imaging module and the image plane A' is d; and when the output shaft of the second motor is parallel to the X axis, an angle between the second motor and the X axis is defined as 0°, characterized in that, the Step 3 specifically comprises:
Step 3-1': calculating an angle θ between a line O'Q' and the X axis in the image plane (A'), calculating an angle α of ∠O'NQ' in a plane O'NQ' according to the distance d between the focal point N and the image plane A'; and
Step 3-2': separately or simultaneously driving the first motor and the second motor, to cause the second motor to rotate to an angle of θ±90° and cause the laser pointer to swing to the angle α, so that the real-time laser spot projection position P' coincides with the projection position Q' of the target object in the image plane.

11. The light spot indication method of claim 8,
the laser indication module comprises a laser pointer and a driving means including a third motor and a forth motor, wherein the third motor and the forth motor drive the laser pointer to swing in an X axis direction and a Y axis direction which is vertical to the X axis direction, respectively,
characterized in that, the imaging module shoots and obtains the real-time laser spot projection position P' in the image plane, and compares the projection position P' with the projection position Q' of the target object, and
the Step 3 specifically comprises:
causing the laser pointer to swing in the X axis direction until the laser spot projection position P' has the same x-axis coordinate as the projection position Q' of the target object in the image plane; and
causing the laser pointer to swing in the Y axis direction until the laser spot projection position P' has the same y-axis coordinate as the projection position Q' of the target object in the image plane.

* * * * *